Sept. 20, 1938.　　　W. A. TOLSON　　　2,130,913
SYSTEM FOR THE COMMUNICATION OF INTELLIGENCE
Filed April 30, 1935　　2 Sheets-Sheet 1

INVENTOR
William A. Tolson
BY
ATTORNEY

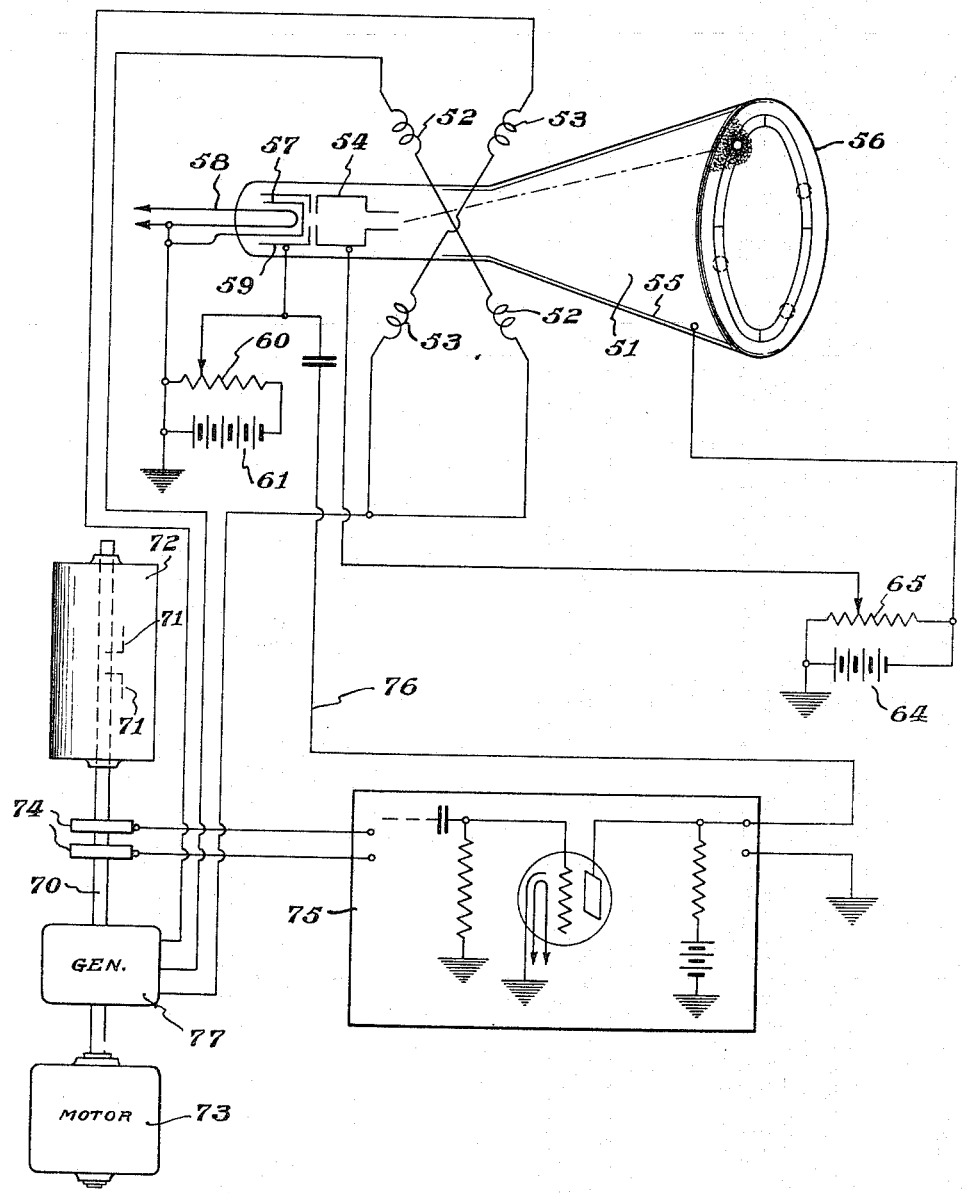

Patented Sept. 20, 1938

2,130,913

UNITED STATES PATENT OFFICE 2,130,913

SYSTEM FOR THE COMMUNICATION OF INTELLIGENCE

William A. Tolson, Westmont, N. J., assignor to Radio Corporation of America, a corporation of Delaware Application April 30, 1935, Serial No. 19,031

7 Claims. (Cl. 250—11)

This invention relates to methods of and systems for the communication of intelligence, particularly to the automatic communication of geographic intelligence to moving craft, and has special reference to aeronautical navigation systems.

At the present time there are available satisfactory beacon systems enabling a pilot to navigate long distances towards and adjacent to a fixed point on the terrain. It may be said generally that known direction finders, goniometers and the like, while of inestimable value in navigating between widely separated points, are of little aid in orienting an aircraft with respect to the boundaries of an airport so that the actual landing may be accurately and safely accomplished. Modern traffic conditions and safety requirements render of increased importance the problem of enabling a pilot to accurately and instantaneously determine his position with respect to the boundaries of a nearby airport.

Accordingly, a principal object of the present invention is to provide a continuously readable, entirely automatic system for determining the relative location of the boundaries of a port or terminal with respect to a moving craft.

Another object of the invention is to increase the selectivity of the signal collecting means whereby a clear, distinct and well defined pattern of the port is obtained.

Another object of the invention is to provide a micro-wave position indicating system employing a plurality of transmitters operating at a single frequency.

While the invention will be disclosed as embodied in an aeronautical navigation system, its application is not limited thereto, the disclosure in this respect being merely illustrative for the purpose of explaining the inventive concept.

Figure 1:
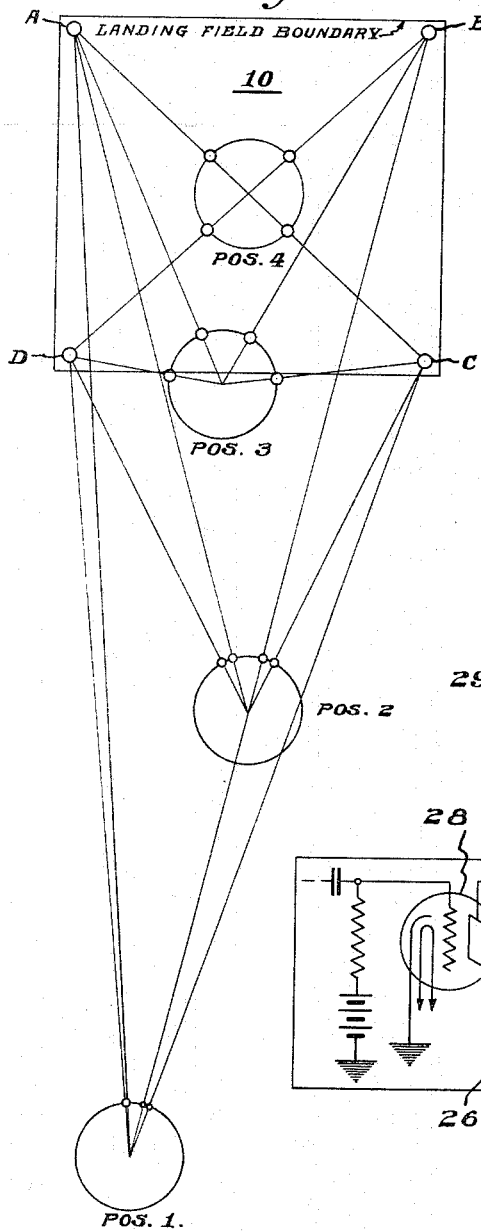
Figure 2:
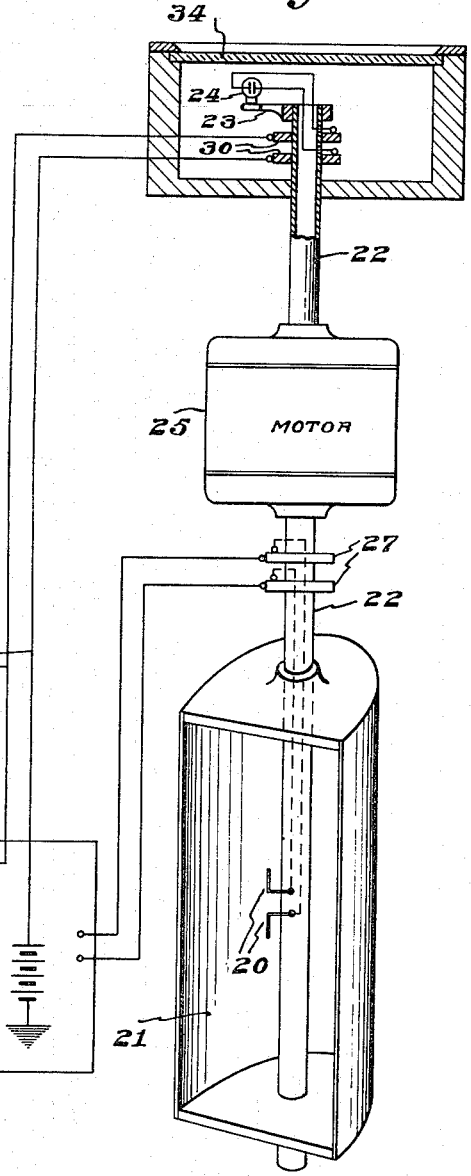

For a detailed disclosure of the invention reference is made to the following specification and to the accompanying drawings wherein:

Figure 1 is a diagrammatic representation of the aeronautical problem involved and shows the operation of the system in its entirety, Fig. 2 shows partly in perspective and partly diagrammatically one embodiment of the receiver comprising among other apparatus a directional antenna, and an indicator constituted by a glow lamp and translucent screen, Fig. 3 is a view similar to that of Fig. 2 and shows a cathode ray tube as the indicator.

Referring first to Fig. 1, 10 designates an airport landing field. In accordance with the invention the boundaries of field 10 are defined by a plurality of oscillators symbolically designated respectively A, B, C and D. If, as is usually the case, the field is provided with boundary marking lights, the oscillators may each be conveniently mounted upon the light pedestals.

Oscillators A, B, C and D are preferably driven by raw alternating current to provide 100% modulation, and all operate at the same or approximately the same centimeter-wave frequency. The power output of each transmitter is preferably sufficient to operate a fairly insensitive receiver at a distance of, say one mile.

The receiving assembly of the embodiments of Figs. 2 and 3, one or another of which is carried aboard the aircraft, is designed to successively pick up the centimeter waves radiated by the respective transmitters. For this purpose the antenna 20 is preferably contained within a parabolic or semi-parabolic reflector 21. Reflector 21 is so designed and is so positioned and arranged aboard the aircraft as to have a very narrow reception angle in a horizontal plane and to be substantially non-selective in a vertical plane.

The antenna 20 and reflector 21 are mounted upon a shaft 22. The mechanical dimensions of the reflector 21 are such as to permit its rotation in a horizontal plane at a rate of at least 16 revolutions per second. On one end of the vertical shaft 22 is a supporting arm 23 carrying a glow lamp 24. The entire assembly 20—24 is driven by a wind propelled or other type motor 25.

The input of a receiver 26 is connected with the rotating antenna 20 through slip rings 27 and the output of the last tube 28 is connected through leads 29 and slip rings 30 to the glow lamp 24, which revolves beneath, and is viewed through, a translucent screen 34. The antenna 20—21 and the lamp 24 are revolved by motor 25 at a speed to ensure "persistence of vision" so that the entire assembly is in effect a stroboscopic indicator; lamp 24 is alternately lit and extinguished as determined by the presence or absence of energy periodically picked up by the antenna from respective of the several transmitters A, B, C and D.

The invention as embodied in Fig. 3 employs a cathode ray tube as the position indicating device. The tube 51 has magnetic deflecting coils 52 and 53 and a focusing anode 54 as well as an accelerating anode 55. The screen end 56 is coated internally with a suitable fluorescent material. The tube is also provided with the usual cathode 57, which may, if desired, be indirectly heated as by means of a filament 58. A control electrode 59 is the other element in the tube; as will hereinafter more fully appear it may be suitably biased to obtain either a "positive" or "negative" indication upon the screen 56. The biasing adjusting arrangement comprises simply a potentiometer 60 disposed across the terminals of a battery or other source of potential 61. Connections are made as shown with the grounded cathode 57. Anodes 54 and 55 are energized by direct current source 64 through potentiometer 65.

As in Fig. 2, an antenna 71 and parabolic reflector 72, driven by a motor 73, are provided to successively pick up energy radiated by the airport transmitters A, B, C and D. The energy so collected passes through slip-rings 74 to a receiver 75 from whence, after being detected and amplified in a manner well known in the radio art, it is impressed through lead 76 upon the control electrode 59 of the tube 51.

The deflecting coils 52 and 53 are energized by a small A. C. generator 77 which may be conveniently mounted upon the common shaft 70. The generator 77 being so arranged, its frequency will be that of the speed of the shaft 70 driven by motor 73, i. e., preferably 16 revolutions per second, or higher. In the absence of any bias or signal potential upon grid 59 the beam emanating from cathode 57 will rotate continuously about the inner circumference of the fluorescent screen 56.

If the receiver 75 is so designed as to translate the energy periodically picked up by antenna 71 into separate negative voltage impulses of sufficient amplitude to momentarily cut off the beam, the circle of light around screen 56 will be broken; the number of breaks or "dark spots" and the position of these spots relative to each other corresponding to the number and sequence of the stations A, B, C and D picked up by antenna 71 in a single revolution. If, on the other hand, grid 59 is normally negatively biased to cut-off, the beam from cathode 57 will impinge upon screen 56 only when a positive voltage impulse, of sufficient amplitude, from receiver 75 is impressed upon the grid 59. Thus it is apparent that either a positive or negative (i. e., "bright spot" or "dark spot") indication, whichever is desired, will appear upon fluorescent screen 56 to notify the observer of the position of his craft with respect to the remotely situated boundary marking transmitters A, B, C and D of Fig. 1.

Referring to Fig. 1 and assuming that an aircraft, carrying an indicator of the type described, is approaching the landing field 10 and is now at the point designated "position 1". As the parabolic reflector 21, Fig. 2, 72 Fig. 3, on the aircraft rotates, the antenna during each revolution will pick up signals from each of the oscillators A, B, C and D that are in line with its plane of reception. If, as shown at 1, two of the oscillators, for instance A and D, are in direct line with the reflector, only a single indication for both boundary points will be registered upon the translucent screen. As the craft approaches position 2 the spots of light on the screen representing the boundaries of the landing field 10 begin to separate, thus giving the pilot a fairly accurate indication as to his distance away from the airport.

At position 2 the pilot may circle the airport if necessary, to assume a preferred landing direction, and while so engaged keep informed as to the position and approximate distance of his craft with respect to the field. As the craft approaches the boundary of the airport, for example at position 3, the fact that two of the spots on the indicator are oppositely located indicates to the pilot that he is crossing the boundary of the field. Likewise, at position 4, the "spots" being symmetrically spaced on the screen, the pilot is informed that his craft is directly over the center of the field.

The system as above described does not provide information as to height of the aircraft above the ground. It thus does not provide sufficient information to permit a totally blind landing. A blind landing in this sense being one in which weather conditions are such as to prevent the pilot from seeing the ground at a distance of more than a few feet. If it is desired to incorporate facilities for making a blind landing this may be done without undue complication by the inclusion of a separate pick-up reflector rotating in a vertical plane. Such an arrangement will provide the pilot with information as to the angle of the boundary markers with the horizontal. This information together with a knowledge of the position of the craft with respect to the airport boundaries will provide an indication of the height of the craft above the ground. The two indicators may be so arranged as to be mutually interactive to provide the necessary information for making a totally blind landing.

While the invention has been described in connection with a system wherein the receiver is positioned aboard a moving craft remote from the transmitters defining the boundaries of the area to be indicated, it will be apparent that the relative position of the transmitters and receiver may be reversed; thus, in the case of a large craft, the oscillators may be positioned adjacent the bow, stern, port and starboard of the craft, and the receiver-indicator at a convenient observation point. In this case the observer will see a well defined pattern of the craft as it approaches or departs from the observation point.

As other applications and embodiments of the invention will suggest themselves to those skilled in the art, the invention is not to be limited except as required by the appended claims and by the prior art.

What is claimed is:

1. The combination with a plurality of radio transmitters arranged in spaced relation about the boundaries of a port, of means on a moving craft to indicate the relative position of said boundaries with respect to said craft, said means comprising a motor, a parabolic reflector including an antenna rotated continuously by said motor, of a speed of not less than sixteen revolutions per second, a generator driven in synchronism with said antenna, a cathode ray tube having a persistent vision type of fluorescent screen, electron beam deflecting means adapted to produce a rotational effect in response to energy from said generator for controlling the angular position of impact of said electron beam against said fluorescent screen, and means responsive to signals successively received by said antenna from respective of said transmitters during each cycle of its rotation for producing a series of spots on said fluorescent screen corresponding in number to said separate received signals.

2. In radio receiving apparatus, the combination of an antenna system which has uni-directional properties, means for rotating said directional antenna, a cathode ray tube, means for producing a rotating electric field as said directional antenna is rotated, means for controlling the beam of said cathode ray tube in accordance with said rotating field and in accordance with signaling energy received over said antenna.

3. In a radio system, the combination of a plurality of transmitters, means for radiating waves from said transmitters, a unidirectional antenna system for receiving said waves, means for rotating said directional antenna system, a cathode ray tube, means for producing a rotating field as said directional antenna is rotated, means for controlling the beam of said cathode ray tube in accordance with said rotating field and in accordance with the energy received by said directional antenna from said radiated waves.

4. In a radio system, the combination of a plurality of radio transmitters, means for radiating waves of similar length from said transmitters, a unidirectional antenna system for receiving said waves, means for rotating said directional antenna system, a cathode ray tube including a fluorescent screen, means for producing a rotating field as said directional antenna is rotated, means for controlling the beam of said cathode ray tube in accordance with said rotating field and in accordance with the energy received by said directional antenna from each of said radiated waves.

5. In a radio system, the combination of a plurality of radio transmitters located to mark the horizontal boundaries of an aircraft landing field, means for radiating waves of similar length from each of said boundary marking transmitters, a unidirectional antenna system for receiving said waves, means for rotating said directional antenna system, a cathode ray tube including a fluorescent screen, means for producing a rotating field as said directional antenna is rotated, means for controlling the impinging of said beam on said fluorescent screen in accordance with said rotating field and in accordance with the energy received by said directional antenna from each of said radiated waves.

6. In a radio system, the combination of a plurality of radio transmitters located to mark the approach to an aircraft landing field, means for radiating waves of similar length from said transmitters, a unidirectional antenna system for receiving said waves, means for rotating said directional antenna system in a vertical plane, a cathode ray tube including a fluorescent screen, means for producing a rotating field as said directional antenna is rotated, means for controlling the beam of said cathode ray tube in accordance with said rotating field and in accordance with the energy received by said directional antenna from each of said radiated waves.

7. The combination with a plurality of radio transmitters arranged in spaced relation about the boundary of a port, of means on a moving craft to indicate the relative position of said transmitters with respect to said craft, said means including the combination of an antenna system which has a unidirectional pattern, means for rotating said unidirectional pattern, a cathode ray tube, means for producing a rotating electric field as said uni-directional pattern is rotated, means for controlling the beam of said cathode ray tube in accordance with said rotating field and in accordance with signaling energy received from said transmitters.

WILLIAM A. TOLSON.